United States Patent
Kobayashi et al.

(10) Patent No.: US 8,085,262 B2
(45) Date of Patent: Dec. 27, 2011

(54) IMAGE DISPLAY APPARATUS AND IMAGE TAKING APPARATUS INCLUDING THE SAME

(75) Inventors: Shuichi Kobayashi, Kanagawa (JP); Masao Majima, Kanagawa (JP); Atsushi Kandori, Kanagawa (JP); Akira Yamamoto, Kanagawa (JP)

(73) Assignee: Canon Kabushiki Kaisha (JP)

( * ) Notice: Subject to any disclaimer, the term of this patent is extended or adjusted under 35 U.S.C. 154(b) by 925 days.

(21) Appl. No.: 10/927,848

(22) Filed: Aug. 27, 2004

(65) Prior Publication Data

US 2005/0057557 A1   Mar. 17, 2005

(30) Foreign Application Priority Data

Aug. 29, 2003   (JP) ................................. 2003-209600

(51) Int. Cl.
*G09G 5/00*   (2006.01)

(52) U.S. Cl. .......................................... 345/213; 353/70

(58) Field of Classification Search .................. 345/7–9, 345/32, 213; 348/744; 438/52; 353/69–70
See application file for complete search history.

(56) References Cited

U.S. PATENT DOCUMENTS

| | | | |
|---|---|---|---|
| 5,467,104 A | | 11/1995 | Furness, III et al. |
| 5,489,950 A | * | 2/1996 | Masuda ......................... 348/744 |
| 5,606,447 A | | 2/1997 | Asada et al. |
| 5,982,555 A | | 11/1999 | Melville et al. |
| 6,800,844 B2 | * | 10/2004 | Kandori et al. ................ 250/234 |
| 6,867,753 B2 | * | 3/2005 | Chinthammit et al. ........... 345/8 |
| 2003/0015652 A1 | | 1/2003 | Kandori et al. |
| 2003/0179427 A1 | | 9/2003 | Lewis et al. |
| 2006/0192094 A1 | * | 8/2006 | Taniguchi et al. ............. 250/235 |

FOREIGN PATENT DOCUMENTS

| | | |
|---|---|---|
| JP | 06-342126 | 12/1994 |
| JP | 07-175005 | 7/1995 |
| JP | 08-334723 | 12/1996 |
| JP | 09-230276 | 11/1997 |
| JP | 2002-509288 A | 3/2002 |
| JP | 2002-365568 A | 12/2002 |
| JP | 2003-057577 | 2/2003 |
| JP | 2003-057586 | 2/2003 |
| JP | 2003-057587 | 2/2003 |
| JP | 2003-131151 A | 5/2003 |
| JP | 2004-527793 A | 9/2004 |

OTHER PUBLICATIONS

Helsel et al. "Wafer Scale Packaging for a MEMS Video Scanner" SPIE vol. 4407 (2001).

* cited by examiner

*Primary Examiner* — Yong H Sim

(74) *Attorney, Agent, or Firm* — Rossi, Kimms & McDowell LLP

(57) ABSTRACT

Provided is image display apparatus, in which a surface to be scanned is two-dimensionally scanned with a light beam which is modulated based on image information and emitted from a light source means and an image formed on the surface to be scanned is observed through an optical system, wherein a synchronization light detection device to obtain synchronization signal related to a scanning start position on the surface to be scanned is disposed on the surface to be scanned, on the vicinity thereof, or on a surface optically conjugate therewith, so that a synchronization signal can be detected with high precision and a preferable quality image can be displayed for observation, and image taking apparatus including the image display apparatus.

10 Claims, 13 Drawing Sheets

IMAGE DISPLAY APPARATUS AND IMAGE TAKING APPARATUS INCLUDING THE SAME

BACKGROUND OF THE INVENTION

1. Field of the Invention

The present invention relates to an image display apparatus and an image taking apparatus including the same, which are suitable to, for example, the case where an image is displayed by two-dimensionally raster-scanning a surface to be scanned with a light beam which is emitted from a light source means and optically modulated based on image information and the image formed on the surface to be scanned is observed.

2. Related Background Art

In an image display apparatus such as a head-mount type display apparatus or an electronic view finder system used for a digital camera or the like, a two-dimensional display element such as a transmission type liquid crystal element, a reflection type liquid crystal element, or an organic EL element and an eyepiece optical system are combined with each other so as to display and observe an image formed on the two-dimensional display element as a virtual image through the eyepiece optical system.

In recent years, high resolution image display has been required for such an image display apparatus. For the requirement, in the case of the two-dimensional display element, it is necessary to produce pixels corresponding to the required number of pixels on the display element. Therefore, the following problems occur. That is, the number of pixel defects increases as the number of pixels increases. A pixel size becomes relatively smaller than a size of the two-dimensional display element, so that it is hard to produce the pixels. The following image display apparatus has been also proposed. That is, a one-dimensional display element and a scanning means are combined with each other. A display of an image on the one-dimensional display element is synchronized with scanning to perform two-dimensional image display, thereby observing the image through an observation optical system. When a resolution of such an image display apparatus is improved, it is necessary to increase the number of pixels on the one-dimensional display element. Therefore, the same problems as those in the case of the two-dimensional display element occur.

On the other hand, instead of using the two-dimensional display element or the one-dimensional display element, there has been known an image display apparatus that displays a two-dimensional image by scanning a retina of an observer with a light beam which is emitted from a light source means and optically modulated based on image information using an optical scanning means capable of performing two-dimensional scanning (for example, U.S. Pat. No. 5,467,104 B). U.S. Pat. No. 5,467,104 B discloses a technique for performing scanning with the light beam of red, blue, or green in two-dimensional directions (horizontal direction and vertical direction) by the optical scanning means and directly forming the two-dimensional image on the retina through an optical system.

According to such an image display technique, the image is displayed by scanning with a light beam. Therefore, unlike an image display apparatus using the two-dimensional image display element or the one-dimensional image display element, it is unnecessary to use a display element including a plurality of pixels formed according to a required resolution. In addition, there is an advantage in that a pixel defect does not fundamentally occur.

In the case where an image display apparatus using the optical scanning means is realized, a micro electro mechanical system (hereinafter referred to as "a MEMS technique") manufactured by a semiconductor process has been known as the optical scanning means (for example, U.S. Pat. No. 5,606,447 B (corresponding to JP 07-175005 A) and JP 08-334723 A). The optical scanning means manufactured by the MEMS technique is reduced in size and weight and can be operated at high speed. Such advantages make the means suitable for the image display apparatus. In addition, there has been known a MEMS technique for manufacturing the two-dimensional scanning means for the head-mount type image display apparatus (for example, SPIE Conference #4407, 29 (June, 2001), "Wafer scale packaging for a MEMS video scanner"). In the optical scanning means manufactured by those MEMS techniques, a reflection surface that reflects light is resonated by a torsion bar or the like. The reflection surface that reflects the light is tilted by utilizing torsion caused at the time of resonance. The light incident on the reflection surface is deflected for scanning. Since the torsion is utilized, the reflection surface that reflects the light is not rotated but oscillated. In the case where the optical scanning means in which the reflection surface is oscillated is used, when outward and homeward actions in oscillation operation, that is, both scanning from right to left and scanning from left to right on the display screen are utilized, the number of scanning lines for image display can be increased to effectively utilize the light. Hereinafter, such scanning is referred to as reciprocating scanning. When scanning is performed in a direction perpendicular to the reciprocating scanning direction together with the reciprocating scanning, two-dimensional reciprocating raster scanning can be realized. When an image is displayed using the reciprocating raster scanning, it is important to take image drawing synchronization between the outward action and the homeward action.

Since the scanning with the oscillation operation becomes a sinusoidal motion in the reciprocating scanning, when the amplitude of the deflection increases, the motion speed decreases. At the maximum amplitude, the motion speed becomes zero. Thus, it is necessary to set a scanning region in which an image is formed (effective scanning region), corresponding to an angle which is smaller than a total scanning angle (total deflection angle).

There has been known a technique with respect to such a scanning image display apparatus and a reciprocating scanning synchronization method (for example, U.S. Pat. No. 5,489,950 B (corresponding to JP 06-342126 A), JP 2003-57586 A, and JP 2003-57587 A).

U.S. Pat. No. 5,489,950 B (corresponding to JP 06-342126 A) discloses a synchronization method for a display apparatus in which a one-dimensional image is deflected for scanning with a deflection mirror and projected as a two-dimensional image. Here, a displacement angle of the deflection mirror that vibrates at a constant angle and a constant cycle is detected with a detector mounted on the deflection mirror, and synchronization timing is produced based on a signal from the detector.

JP 2003-057586 A discloses an image forming apparatus including an optical scanning device and a vibrator member used for the optical scanning apparatus. This discloses a technique using a MEMS and a micro-mirror. According to JP 2003-57587 A, light beams of R, G, and B, which are emitted from laser light sources, are combined by a color combining means and the combined light beam is guided to an optical fiber system. The light beam exited from the optical fiber system is collimated by a collimating optical system and allowed to enter a horizontal scanning means to perform horizontal scanning. The light beam from the horizontal scanning means is allowed to enter a vertical scanning means through a relay optical system, so that scanning is performed in the vertical direction. After that, the scanning light beam is allowed to enter an eye of an observer through a second relay optical system. A synchronization light detecting sensor (BD sensor) is disposed between the horizontal scanning means and the vertical scanning means. An electric signal obtained when scanning light transmits over the BD sensor is sent to a BD signal detecting circuit to determine start timing for an image signal.

The following technique has been known for an optical scanning device for deflecting a laser beam using a sinusoidal oscillation (for example, JP 09-230276 A). According to the technique, in order to compensate for a displacement of the scanning start points between in the outward action and the homeward action resulting from a variation in deflection frequency, a light beam emitting means is controlled such that the scanning start points coincide with each other. In addition, there has been known a technique for allowing a second light beam for producing a light reception output, which is different from a first light beam for scanning an effective scanning region, to enter a deflector, thereby preventing an interference between optical paths (for example, JP 2003-57577 A).

According to U.S. Pat. No. 5,489,950 B (corresponding to JP 06-342126 A) described above, when a synchronization signal is detected in the display apparatus in which the one-dimensional image is deflected for scanning with the-deflection mirror and projected as the two-dimensional image, drive signals and a deflection angle detecting means for the deflection mirror are used to synchronize the deflection mirror with the image. In U.S. Pat. No. 5,489,950 B (corresponding to JP 06-342126 A), since scanning light is not detected, sufficient precision is not obtained in some cases.

JP 2003-57586 A discloses that the detection of the synchronization signal is performed by the light beam in scanning by the horizontal scanning means. However, no specific optical system is described in the publication. Since no optical system is disposed between the horizontal scanning means and the synchronization light detecting means, an effective beam and a beam for the detection of the synchronization light are likely to overlap with each other.

According to JP 09-230276 A, the optical arrangement in which the scanning start points in the outward action and the homeward action of the sinusoidal oscillation coincide with each other is described. A specific surface to be scanned is scanned by a one-dimensional scanning means to form an image on the surface to be scanned. Further, since first and second light detectors are disposed in a region corresponding to angles other than an effective deflection angle within all deflection angles of a scanning means which is oscillated, when an interval between an optical path corresponding to the effective deflection angle and an optical path for a synchronization light detector is narrowed, an interference (overlapping) between the optical paths occurs to cause that a light quantity loss of an effective beam may occurs in some cases.

According to JP 2003-57577 A, since the second light beam for producing the light reception output, which is different from the first light beam for scanning the effective scanning region, is allowed to enter the deflector, the interference between the optical paths does not occur. However, the configuration is complicated because the separate beams are used.

SUMMARY OF THE INVENTION

An object of the present invention is to provide: an image display apparatus in which a synchronization light detecting means is disposed at a suitable position in the case where a surface to be scanned is two-dimensionally scanned with a light beam which is optically modulated based on image information and emitted from a light source means by using a scanning means which is oscillated and image information formed on the surface to be scanned is observed, so that a synchronization signal can be detected with high precision and a preferable quality image can be displayed for observation; and an image taking apparatus including the image display apparatus.

Another object of the present invention is to provide: an image display apparatus in which synchronization signals are detected in both a going path and a returning path on a surface to be scanned, so that the surface to be scanned can be optically scanned with high precision and a preferable quality image can be formed for observation; and an image taking apparatus including the image display apparatus.

According to one aspect of the present invention, an image display apparatus comprises light source means, canning means for two-dimensionally scanning a surface to be scanned with the light beam, modulated based on image information, emitted from the light source means, and an optical system, wherein an image formed on the surface to be scanned can be observed through the optical system; and wherein at least one synchronization light detecting means for obtaining a synchronization signal related to a scanning start position on the surface to be scanned, where the at least one synchronization light detecting means is provided on the surface to be scanned or on a surface optically conjugate with the surface to be scanned.

In further aspect of the invention, the scanning means comprises a reflection type deflecting means which can resonate, and forms the image on the surface to be scanned in an outward path and a homeward path, which are caused by an oscillation due to resonance of the reflection type deflecting means.

In further aspect of the invention, the synchronization light detecting means detects the synchronization signal in each of the outward path and the homeward path on the surface to be scanned.

In further aspect of the invention, the synchronization light detecting means comprises an area sensor and obtains the synchronization signal using incident position information of scanning light incident on a surface of the area sensor in each of the outward path and the homeward path.

In further aspect of the invention, the scanning means comprises one or two scanning portions for performing two-dimensional scanning by scanning in a direction perpendicular to a direction of the oscillation.

In further aspect of the invention, two synchronization light detecting means are provided to obtain synchronization signals in each of the outward path and the homeward path on the surface to be scanned.

In further aspect of the invention, a start writing position in each of the outward path and the homeward path on the surface to be scanned is controlled using the synchronization signal from the synchronization light detecting means.

According to another aspect of the present invention, an image taking apparatus comprises an image taking portion for taking an image of a subject, and the image display apparatus, where the image taken by the image taking portion is displayed on the image display apparatus.

DETAILED DESCRIPTION OF THE PREFERRED EMBODIMENTS

Embodiment 1

Embodiment 1 of the present invention will be described below.

Figure 1:
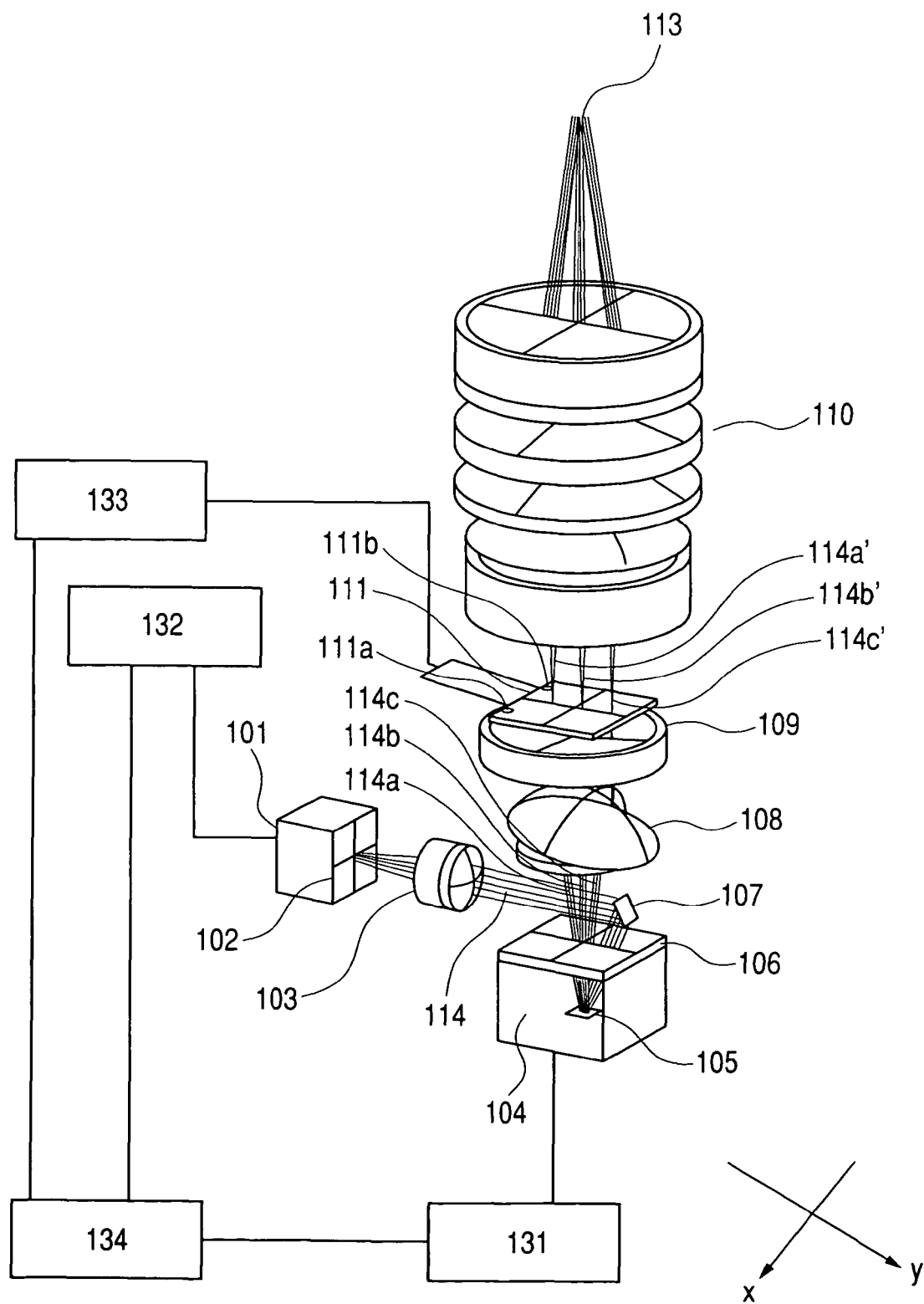
FIG. 1 is a main part structural diagram showing an image display apparatus according to Embodiment 1 of the present invention.
Figure 2:
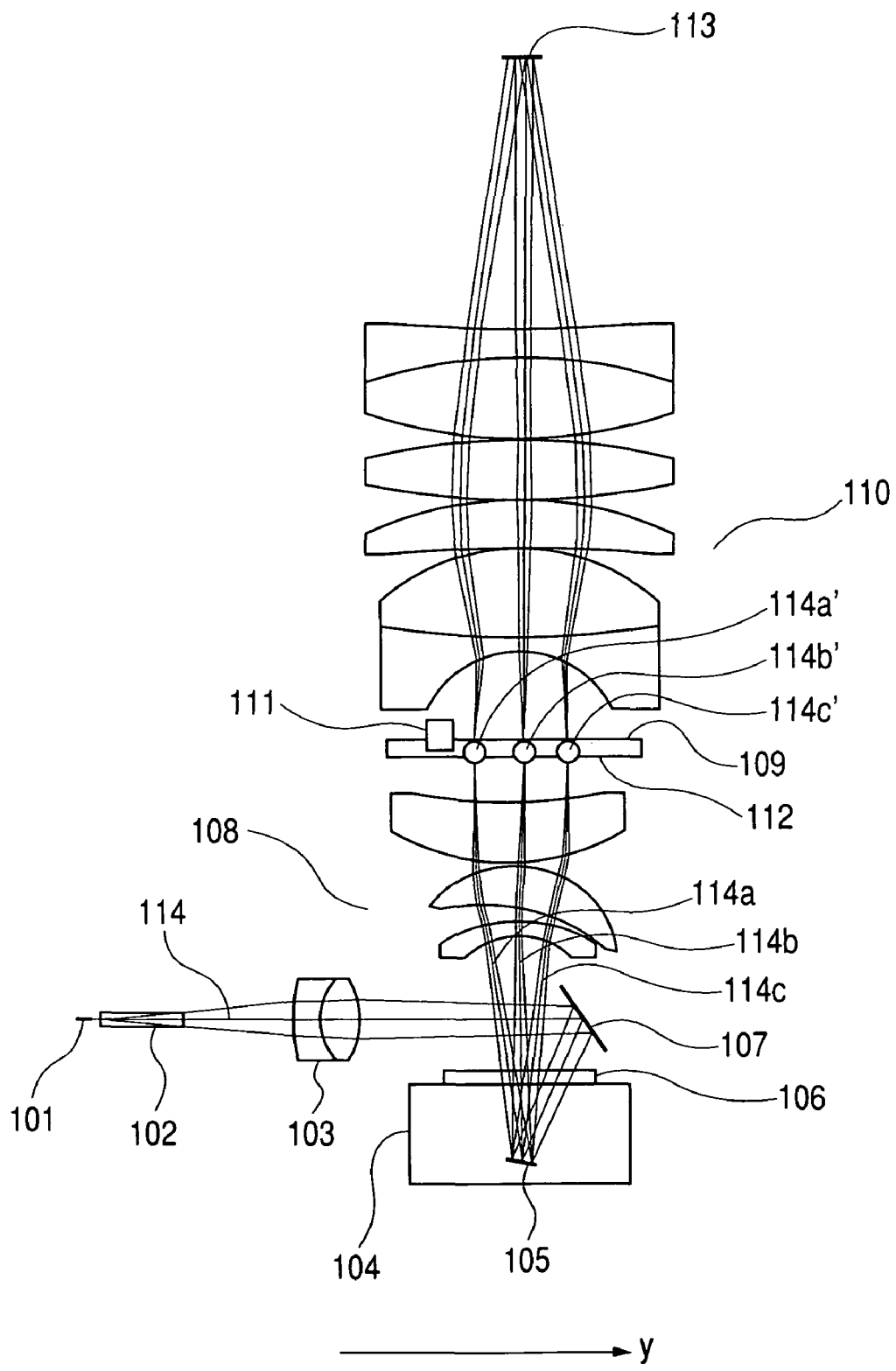
FIG. 2 is a main part sectional view showing the image display apparatus of FIG. 1 in a vertical scanning direction.

FIG. 1 is a schematic explanatory view showing a scanning image display apparatus used for an electronic view finder. FIG. 2 is a main part sectional view showing the image display apparatus of FIG. 1 in a vertical scanning direction. The entire structure of the image display apparatus will be described with reference to FIGS. 1 and 2.

A light beam including a plurality of color light beams, which is emitted from a light source means 101, transmits through a color combining optical system 102 for combining the plurality of color light beams, a condensing optical system 103 composed of a condenser lens, a collimator lens, and the like, a deflection mirror 107, and a cover glass member 106, and is incident on a scanning means 104 capable of performing two-dimensional scanning. The scanning means 104 includes a deflection mirror 105 produced using a MEMS technique and performs two-dimensional scanning with the incident light beam within a predetermined scanning angle. In FIG. 1, a direction indicated by symbol "x" is a horizontal scanning direction (x-direction) and a direction indicated by symbol "y" is a vertical scanning direction (y-direction) (within cross section in FIG. 2). The scanning means 104 is oscillated for scanning in the x-direction.

A light beam 114 incident on the scanning means 104 is deflected by the deflection mirror 105 of the scanning means 104 to produce, for example, scanned light beams 114a, 114b, and 114c.

A surface to be scanned 109 is scanned with the deflected light beams through a scanning optical system 108.

The light source means 101 and the surface to be scanned 109 have a conjugate relationship, therebetween disposing the condensing optical system 103, the scanning optical system 108, or the like. Therefore, light source images of the light source means 101 are formed on the surface to be scanned 109. The light beams to be scanned 114a, 114b, and 114c form light source images 114a', 114b', and 114c' on the surface to be scanned 109. FIG. 1 shows an example in the case where scanning is performed in the y-direction.

A transparent member or a diffusion member is disposed on the surface to be scanned 109 and a two-dimensional image is formed on the member.

The light source means 101 is electrically connected with a light source drive circuit 132. The scanning means 104 is electrically connected with a scanning means control circuit 131. The light source drive circuit 132 and the scanning means control circuit 131 are connected with a display portion drive circuit 134. When a video signal corresponding to a desired image is inputted from a video signal input means (not shown), the display portion drive circuit 134 simultaneously controls the light source means 101 and the scanning means 104 to display the desired image on the surface to be scanned 109.

A light beam of an image formed on the surface to be scanned 109 is incident on an eyepiece optical system 110. An exit pupil 113 is an exit pupil position of the eyepiece optical system 110. An observer (not shown) observes a virtual image of the image formed on the surface to be scanned 109 by utilizing an afterimage effect in a state in which the exit pupil 113 is assumed to be the pupil of the observer. Synchronization light detecting means 111 (111a and 111b) obtain synchronization signals for setting scanning start positions and are disposed on the surface to be scanned 109 on which the light source images of the light source means 101 are formed. The synchronization light detecting means 111 are disposed on the surface to be scanned 109 outside an effective area for displaying an actual image in the y-direction which is the vertical scanning direction. As shown in FIGS. 1 and 2, since each of the light beams is condensed near the surface to be scanned 109, the synchronization light detecting means 111 can be disposed at positions where a mechanical interference (overlapping) with the optical path of a light beam for displaying the actual image does not occur.

The start positions of writing in the outward path and the homeward path on the surface to be scanned are controlled using the synchronization signals obtained by the synchronization light detecting means 111 (111a and 111b).

Figure 20:
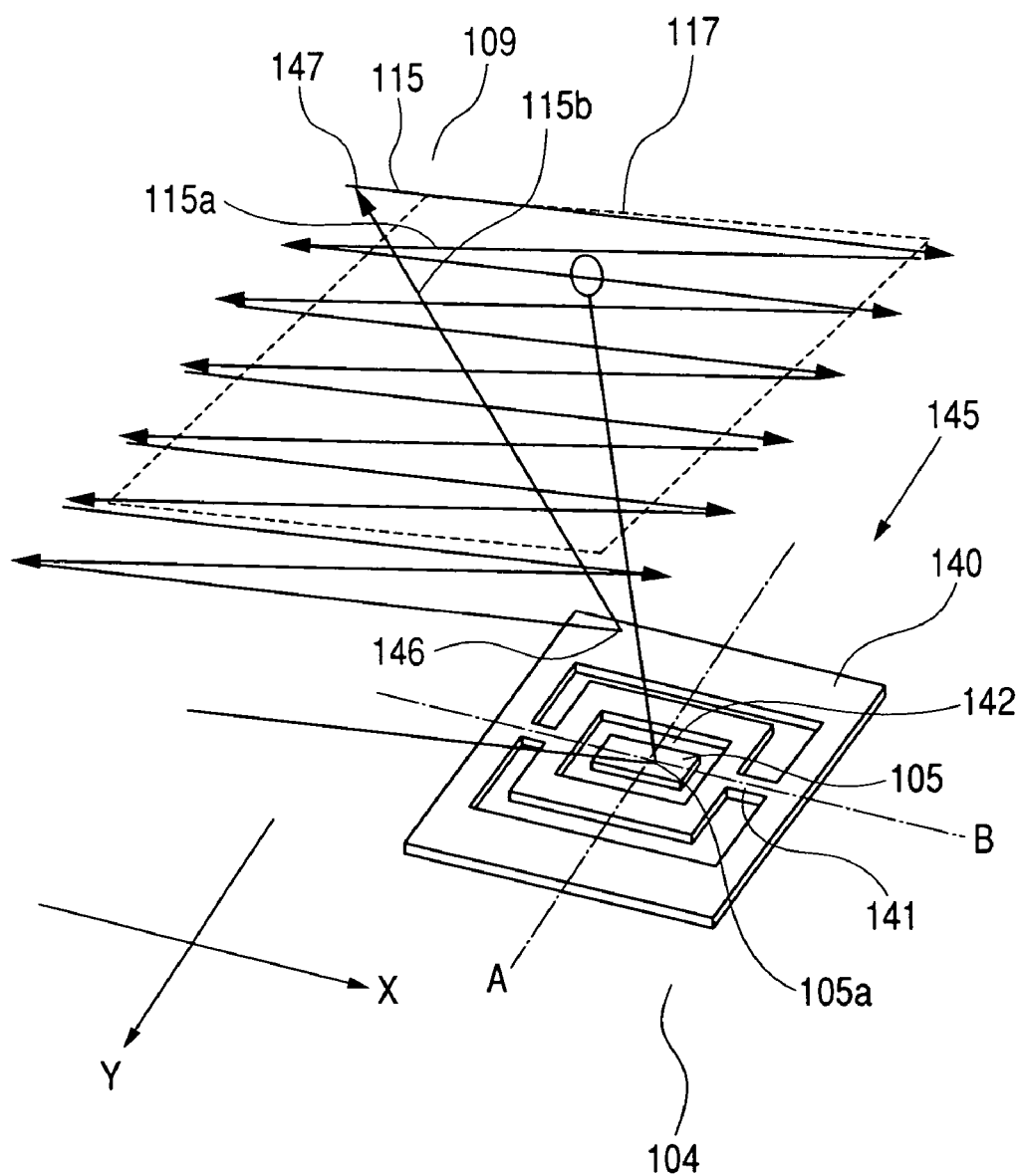
FIG. 20 is an explanatory view showing a scanning means shown in FIG. 1.

Next, a summary of the optical scanning means 104 will be described with reference to FIG. 20. FIG. 20 shows a main part configuration of the optical scanning means 104 and a relative positional relationship between the optical scanning means 104 and the surface to be scanned 109. The optical scanning means 104 has a substrate 140. A reflection mirror (deflection mirror) 105 is configured at a deflection point 105a on the substrate 140. A torsion bar 142 for the oscillation operation in the horizontal direction (x-direction) and a torsion bar 141 for the oscillation operation in the vertical direction (y-direction) are provided in the reflection mirror 105 and compose a gimbal structure. The reflection mirror 105 is driven by an actuator (not shown) in the horizontal direction (x-direction). Therefore, a deflection angle of the reflection surface of the reflection mirror 105 changes by virtue of a torsion resonance action of the gimbal structure, thereby scanning the light. The movement in the vertical direction (y-direction) of the reflection mirror 105 is controlled so as to take the synchronization with the horizontal direction (x-direction) to be driven in a saw-tooth wave shape or a triangular wave shape by an actuator (not shown). In FIG. 20, a line 115 indicates an example of an outward path of a scanning line which is caused by the oscillation operation and a line 115a indicates an example of a homeward path of the scanning line. The actual number of scanning lines is larger than that shown in FIG. 20. However, in order to facilitate the understanding, the thinned out scanning lines are shown. In synchronization with the oscillation operation, the reflection mirror 105 is operated to perform scanning in a direction indicted by an arrow 145, which is the y-direction. In addition, by the optical modulation of the light beam synchronously emitted from the light source means 101, an image is displayed within an effective area 117. When the light reaches a scanning end 146 in the vertical direction (y-direction), the light returns to a scanning start point 147 along a return line 115b. That is, a frame rate (frame frequency) of the image is determined by a repetition period in the vertical direction (y-direction).

Figure 3:
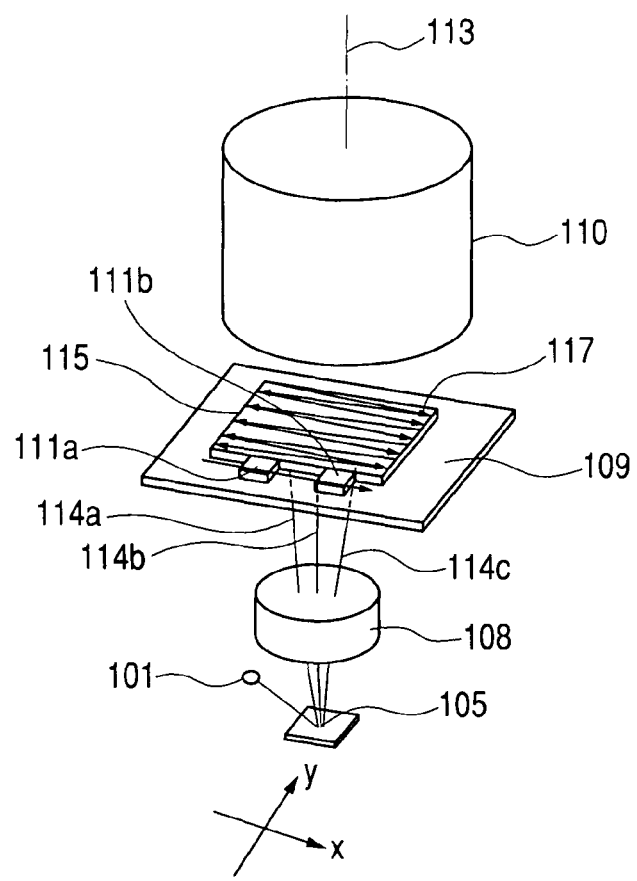
FIG. 3 is a main part perspective view showing a part of the image display apparatus of FIG. 1.

Next, synchronization detection related to a scanning image in a scanning image display apparatus according to this embodiment will be described. FIG. 3 is a schematic view showing a part of the image display apparatus shown in FIG. 1. The same reference numerals indicate the same functions and therefore these descriptions are omitted here. In FIG. 3, the reference numeral 117 indicates the effective area displaying the actual image. The arrow 115 indicates an example of a scanning line. The surface to be scanned 109 is raster-scanned in an order indicated by the arrow 115. The synchronization light detecting means 111a and 111b are disposed on the surface to be scanned 109 outside the effective area 117 for displaying the actual image. The synchronization light detecting means 111a and 111b are electrically connected with a synchronization detection circuit 133 shown in FIG. 1. The synchronization detection circuit 133 is electrically connected with the display portion drive circuit 134 shown in 1. The display portion drive circuit 134 is controlled on the basis of the signals from the two synchronization light detecting means 111a and 111b that are disposed to obtain the synchronization signals in the outward path and in the homeward path, respectively.

Figure 4:
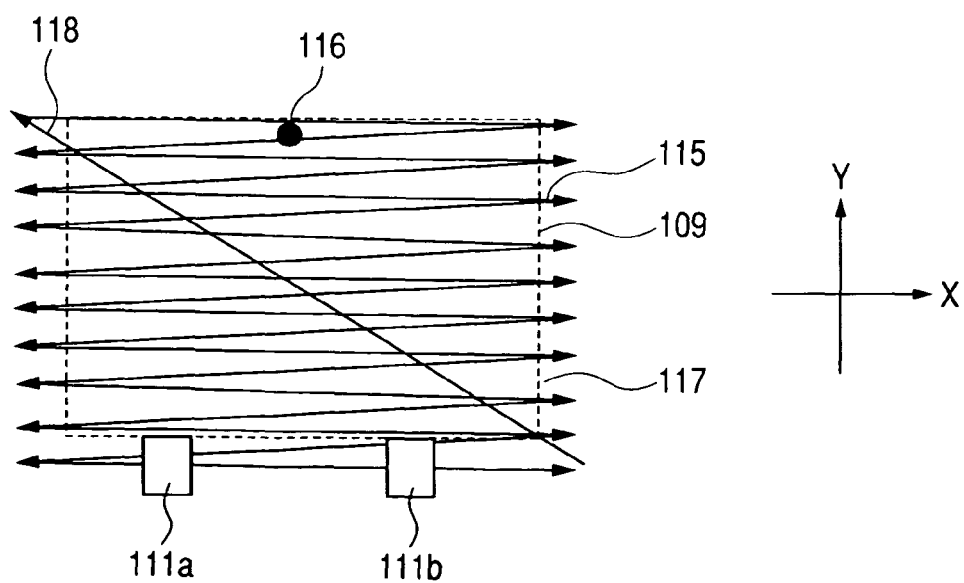
FIG. 4 is an explanatory view showing an arrangement of a synchronization light detecting means on a surface to be scanned with respect to scanning light.
Figure 5:
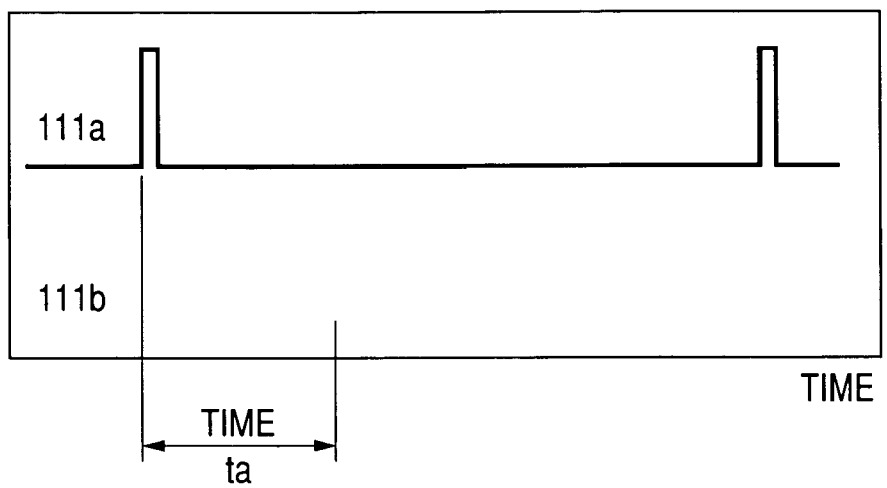
FIG. 5 is an explanatory view showing outputs of the synchronization light detecting means.
Figure 6A:
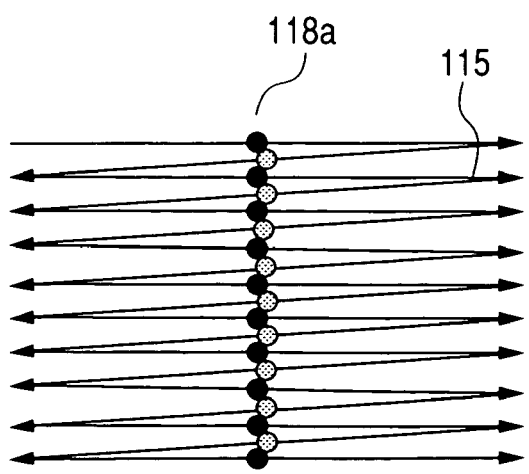
FIGS. 6A and 6B are explanatory views showing the presence or absence of a displacement in reciprocating scanning.
Figure 6B:
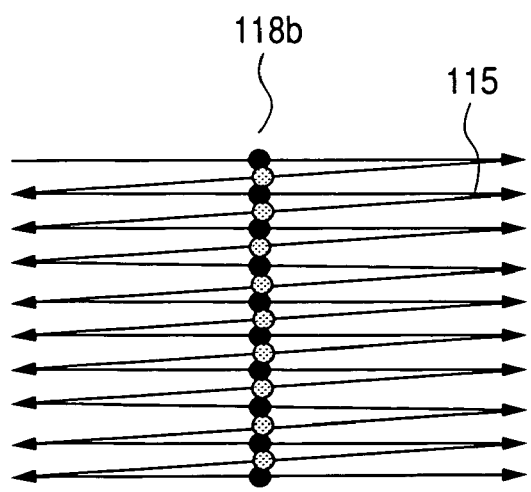

FIG. 4 is a schematic view showing a relative positional relationship between the scanning line on the surface to be scanned 109 and the synchronization light detecting means 111a and 111b. With respect to the horizontal scanning, the reciprocating scanning is performed by the oscillating operation in the x-direction on the paper in FIG. 3. The vertical scanning is performed in the y-direction perpendicular to the x-direction. After the vertical scanning, the light returns along an arrow 118 and scanning is repeated. In FIG. 4, the area for displaying the actual image on the surface to be scanned 109 is the effective area 117 indicated by a dot line. There is over-scanning area other than the effective area 117 in both the horizontal direction (x-direction) and the vertical direction (y-direction). A desirable image is displayed on the effective area 117. To detect the synchronization signals, light beams are continuously emitted from the light source means 101 to the over-scanning areas on which the synchronization light detecting means 111a and 111b are disposed. FIG. 5 shows optical signals incident on the synchronization light detecting means 111a and 111b when continuous light emission is performed by the light source means 101. The synchronization detection circuit 133 detects a time interval ta between the light beams detected by the synchronization light detecting means 111a and 111b. FIG. 6A shows the case where light emission timings of the light source means in the reciprocating scanning doesn't match, so that a line become not straight but rough. By controlling the light emission timings of the light source means based on the detected time interval, the light emission timings can be set so as to obtain a straight line as shown in FIG. 6B, with the result that scanning positions in the reciprocating scanning can be made to coincide with each other. That is, the line can be formed as a straight line.

In this embodiment described above, the starting point of the writing positions in the outward path and the homeward path on the surface to be scanned are controlled by the synchronization signals obtained by the synchronization light detecting means 111 (111a and 111b). Therefore, a preferable quality video image can be obtained.

Figure 7:
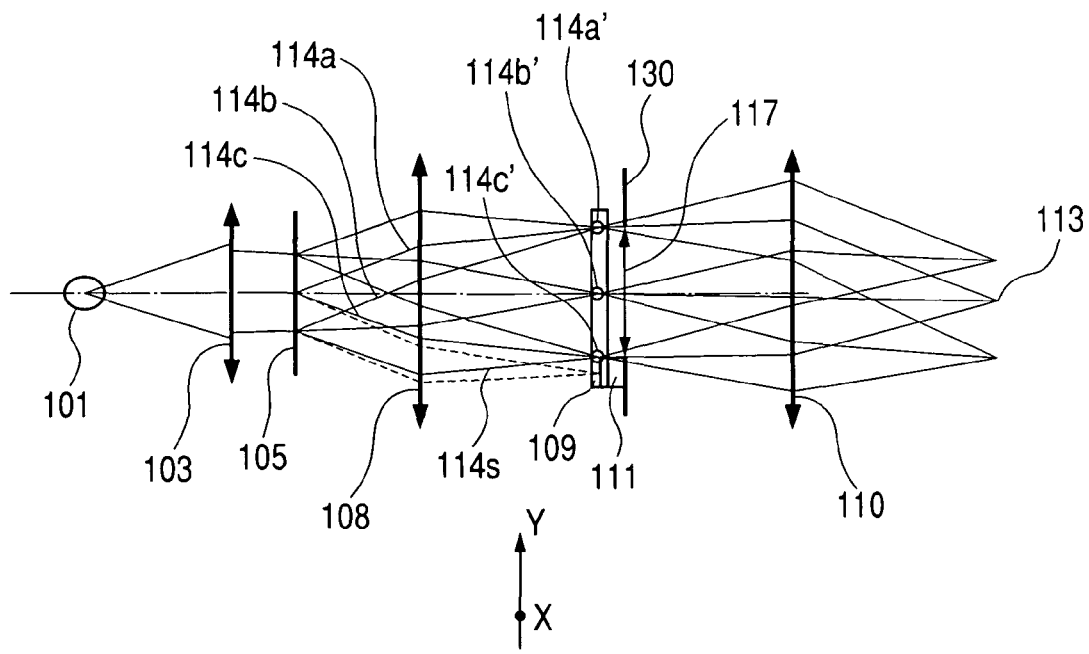
FIG. 7 is an optical system explanatory view showing a development of an optical path of an optical system shown in FIG. 1.

FIG. 7 is an explanatory view showing an optical path of the optical system in this embodiment. In order to facilitate the understanding, the optical path is developed. FIG. 7 shows an optical section including the optical axis and the vertical scanning direction (y-direction).

A light beam emitted from the light source means 101 is incident on the scanning means 104 through the condensing optical system 103. The light beam is deflected on the deflection point 105. After traveling through the scanning optical system 108, the light beam scans the surface to be scanned 109 to form a light source images corresponding to the produced light beams. For example, the light source images 114a', 114b', and 114c' corresponding to the scanning light beams 114a, 114b, and 114c are formed on the surface to be scanned 109. A light beam 114s transmitting through the scanning optical system 108 is a light beam that travels to the synchronization light detecting means 111. The light source images 114a', 114b', and 114c' are formed within the effective area 117, thereby displaying a desirable image. The light beam 114s is used for synchronization light detection and continuously emitted. As shown in FIG. 7, each of the light beams produced based on the light beam from the light source means 101 is condensed on the surface to be scanned 109. Therefore, the light beam for displaying the image on the effective area 117 can be completely separated from the light beam for synchronization detection.

In FIG. 7, a field stop 130 prevents the light beam for synchronization detection from being incident on the eyepiece optical system 110.

In this embodiment, the synchronization light detecting means 111 are disposed on the over-scanning areas other than the effective area 117 in the vertical direction (y-direction). With respect to the scanning means that oscillates in the horizontal direction, a scanning speed thereof is high in the vicinity of the center of scanning in the horizontal direction. Therefore, when the synchronization light detecting means are disposed in the vicinity of the center of scanning, high precision detection is possible. Note that the synchronization light detecting means are not necessarily disposed at such a position. Therefore, the synchronization light detecting means may be disposed at positions apart from the center of scanning.

In this embodiment, as shown in FIGS. 1 and 2, a single light source portion is disposed as the light source means 101. In actual, for example, using semiconductor light sources for emitting red light, blue light, and green light, disposing them at equivalent positions through the color combining optical system 102, and controlling each of the light source means by the separate light source drive circuit 132 based on a signal from the display portion control circuit 134, a color image can be obtained. In this case, the light source means used for synchronization light detection may be at least one of the plurality of light source means.

In this embodiment, a photoelectric transducer is used for the synchronization light detecting means. A slit and the like are disposed on a light incident side of the light receiving surface of the photoelectric transducer. When the slit is disposed, a beam can be shaped, stray light can be removed, and the precision can be improved. In this embodiment, the synchronization light detecting means 111 are disposed on the surface to be scanned 109 to capture time information related to the scanning light beam on the surface to be scanned 109. However, the same effect can be obtained if an optical system is configured to make a conjugate position with respect to the surface to be scanned 109 so as to capture the same information at the position.

Figure 8:
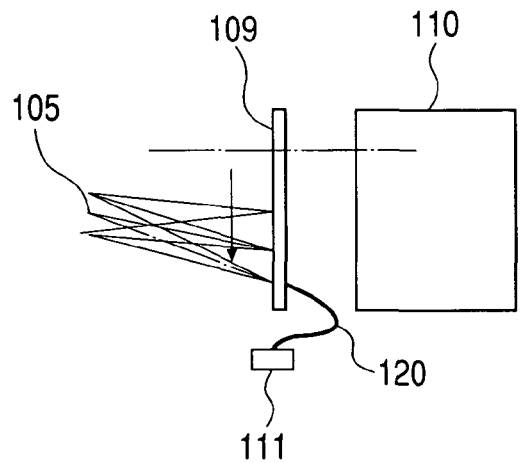
FIG. 8 is an explanatory view showing another aspect in Embodiment 1.

FIG. 8 shows an embodiment in which the light for synchronization detection on the surface to be scanned 109 can be obtained via light transmitting means 120 such as optical fiber. In this case, the synchronization light detecting means 111 can be disposed apart from the surface to be scanned 109.

Figure 9:
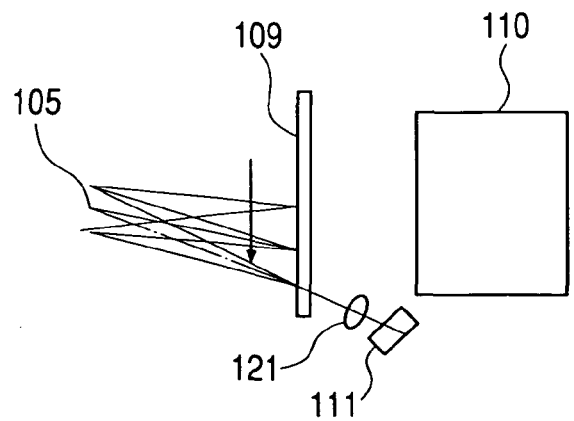
FIG. 9 is an explanatory view showing another aspect in Embodiment 1.
Figure 10:
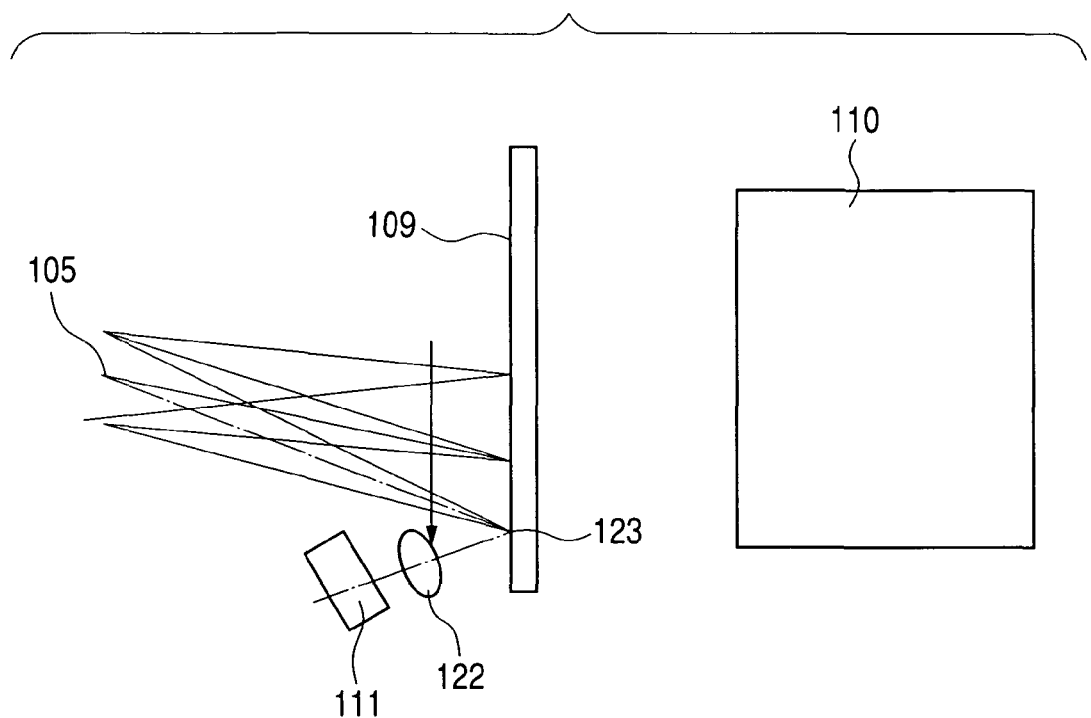
FIG. 10 is an explanatory view showing another aspect in Embodiment 1.

FIG. 9 shows an embodiment in which the light for synchronization detection on the surface to be scanned 109 can be obtained by the synchronization light detecting means 111 through an optical system 121. FIG. 10 is an embodiment in which the light for synchronization detection on the surface to be scanned 109 is reflected on the surface to be scanned 109 by a reflection means 123 and captured by the synchronization light detecting means 111 through an optical system 122. In each of those embodiments, the same effect as that described above can be obtained.

Figure 11:
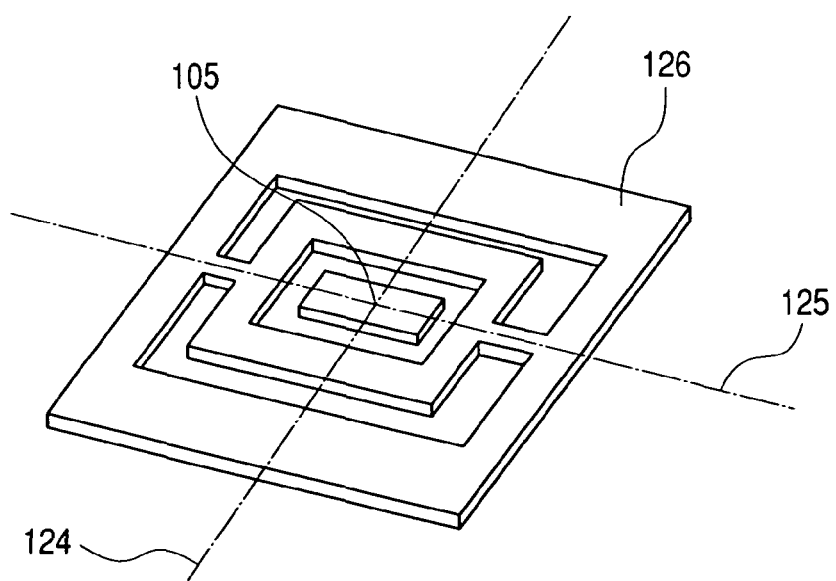
FIG. 11 is an explanatory view showing a scanning means shown in FIG. 1.

FIG. 11 is an explanatory view showing a structure of the scanning means 104 in this embodiment. In FIG. 11, an MEMS scanning mirror produced by a semiconductor process is used. To efficiently reflect incident light, for example, a metal member (reflection member) made of Al, Ag, or the like is formed on the reflection surface of the reflection mirror 105 for light deflection. A drive means (not shown) is provided in the scanning means 104. For example, the deflection mirror 105 is vibrated for torsion about axes 125 and 126 by electrostatic force or electromagnetic force. Therefore, the reflection mirror (optical deflection surface) 105 is tilted for light deflection and reflection. An MEMS drive method and the like are not particularly limited as long as two-dimensional scanning can be performed with the method and the like.

In this embodiment, the synchronization signals are detected according to the light information on the surface to be scanned 109. Providing, for example, a means for detecting a scanning angle in order to detect an angle of the deflection surface of the optical scanning means, the control may be performed based on both the light information and the scanning angle.

As described above, according to this embodiment, if the scanning means is composed of the movable reflection type deflection means, and if drawing is performed during the outward path and the homeward path that are caused by the oscillation of the deflection means due to resonance movement, a preferable image can be formed during the outward path and the homeward path by obtaining the synchronization signals in the reciprocating scanning caused by the oscillation.

Embodiment 2

Figure 12:
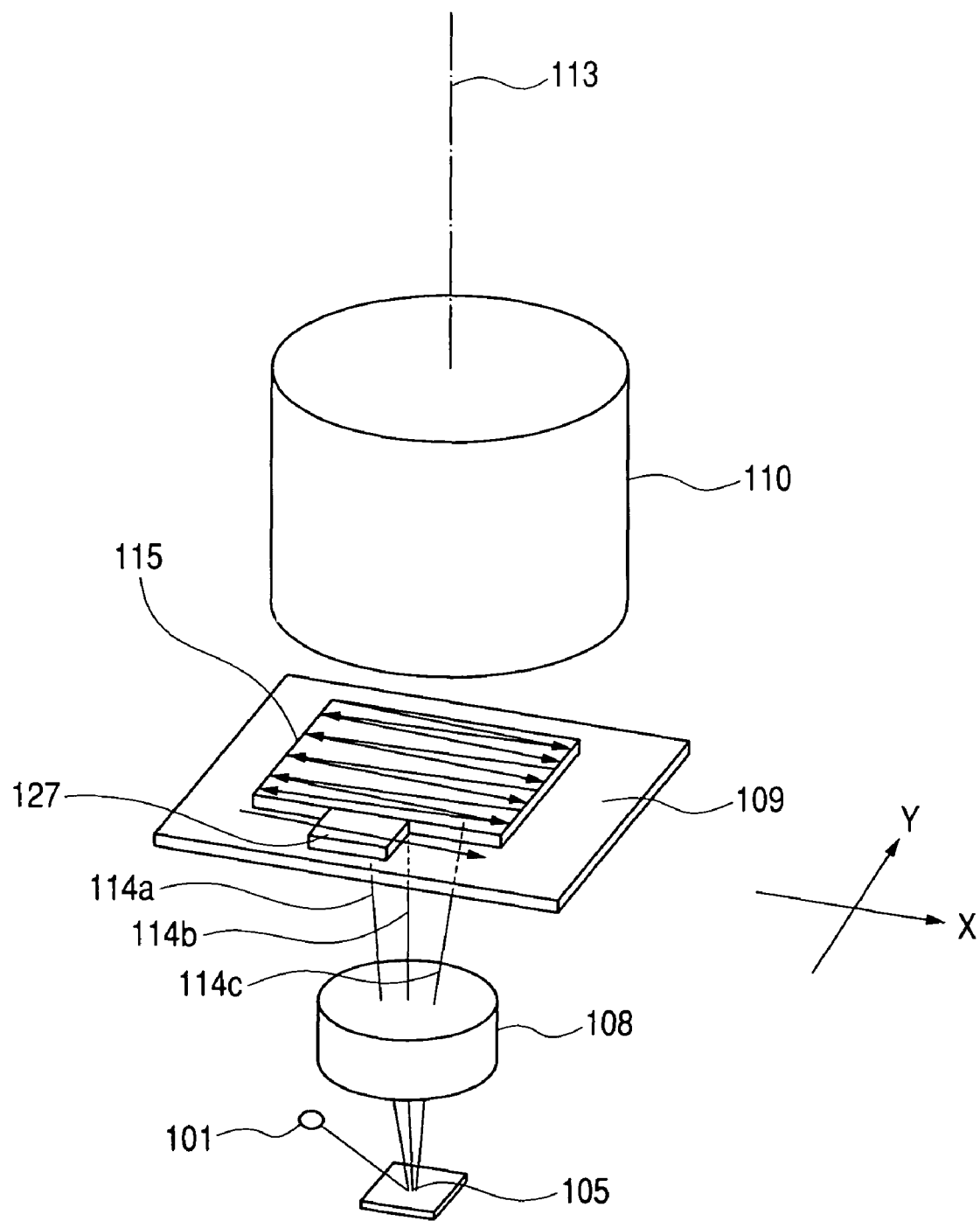
FIG. 12 is a main part explanatory view showing an image display apparatus according to Embodiment 2 of the present invention.

FIG. 12 is a main part schematic view showing an image display apparatus according to Embodiment 2 of the present invention. In this embodiment, a type of the synchronization light detecting means and the position thereof are different from those in Embodiment 1 shown in FIG. 1.

In FIG. 12, the same reference numerals are provided for the same elements as those indicated in Embodiment 1.

The same reference numerals as those in Embodiment 1 indicate the same functions and therefore the descriptions are omitted here.

Figure 13:
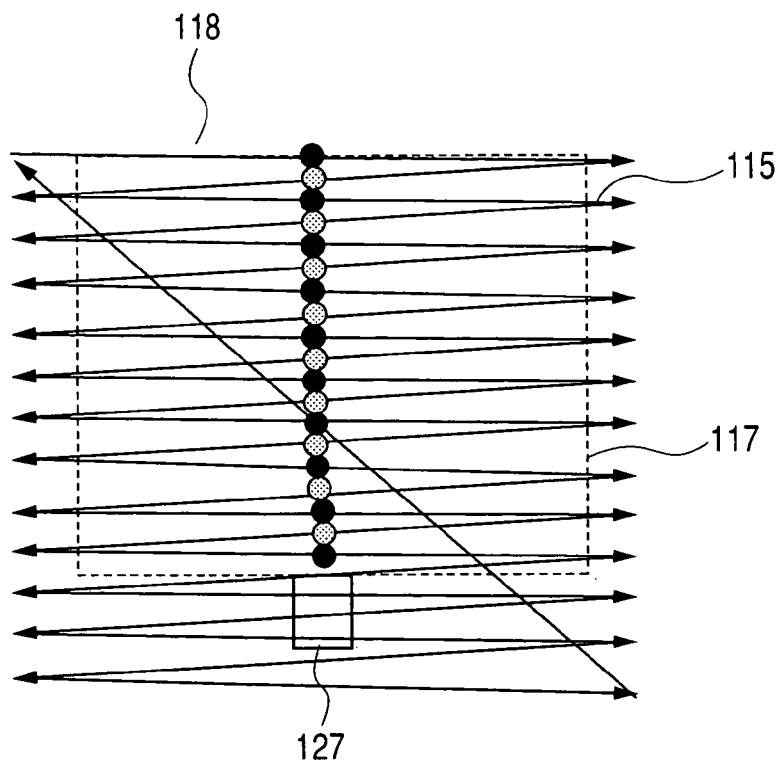
FIG. 13 is an explanatory view showing an arrangement of a synchronization light detecting means on a surface to be scanned with respect to scanning light.
Figure 14:
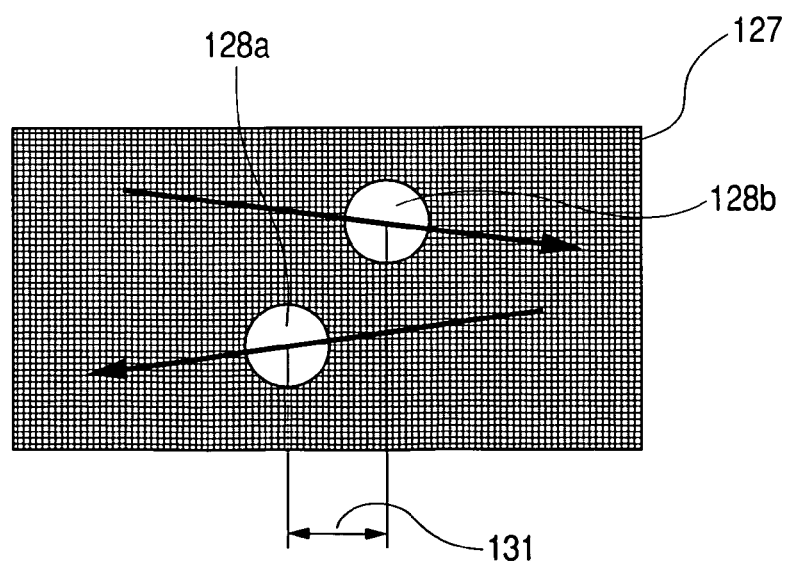
FIG. 14 is an explanatory view showing a position alignment in reciprocating scanning, which is performed using an area sensor.

In FIG. 12, reference numeral 127 denotes a synchronization light detecting means. In this embodiment, the synchronization light detecting means 127 is disposed within an over-scanning area on the surface to be scanned 109 in the vertical direction (y-direction). FIG. 13 shows an arrangement of the synchronization light detecting means 127. As shown in FIG. 13, the synchronization light detecting means 127 is disposed at the center of the over-scanning area other than the effective area 117 on the surface to be scanned 109. As shown in FIG. 14, the synchronization light detecting means 127 in this embodiment is composed of an area sensor having a plurality of pixels. To detect the synchronization light in the reciprocating scanning on the over-scanning region, points 128a and 128b are drawn within the area sensor of the synchronization light detecting means 127 at timings in the outward path and the homeward path. A distance 131 between the points 128a and 128b on the area sensor is detected. The synchronization control between the light source means and the scanning means is performed based on the position information related to the distance. Therefore, as in Embodiment 1, the synchronization signals in the outward path and the homeward path in the reciprocating scanning can be obtained to adjust the position of an image.

The position information of the light source images (incident light beams) condensed on the surface to be scanned 109 is detected by the synchronization light detecting means 127 composed of the area sensor in this enbodiment, however, the synchronization light detecting means may be any detecting means capable of detecting the position information of the light source images.

In this embodiment, only the light source means 101 is disposed, however, in actual, red light, blue light, and green light emitted from the semiconductor light sources and the like are combined by the color combining means, and each of the light sources is controlled by the separate light source drive circuit based on a signal from the display portion control circuit. Thus, a color image is obtained.

In this case, the light source means used for synchronization light detection may be at least one of the plurality of light source means.

Embodiment 3

Figure 15:
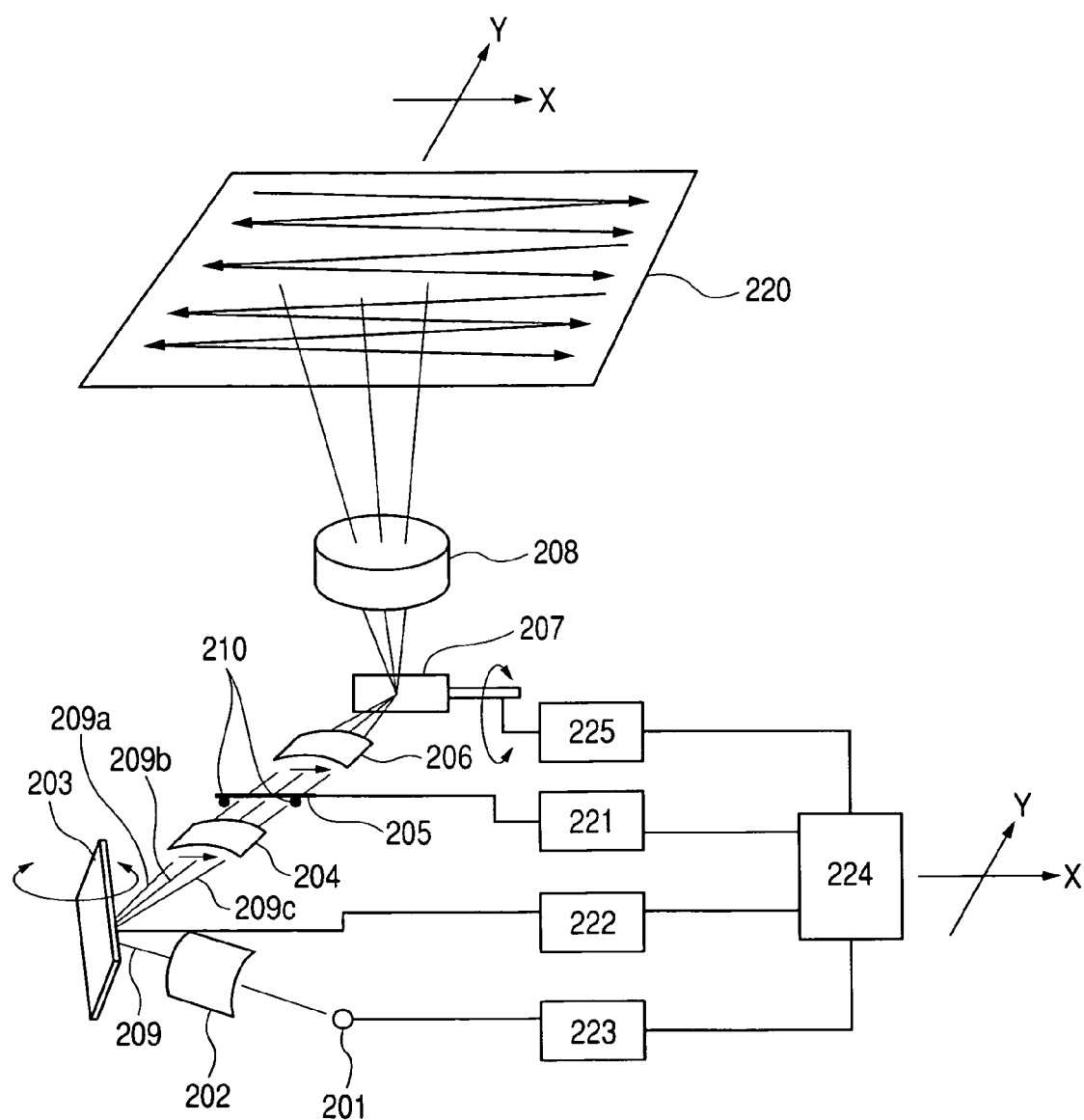
FIG. 15 is an explanatory diagram showing a main part structure of an image display apparatus according to Embodiment 3 of the present invention.

FIG. 15 is a main part schematic diagram showing an image display apparatus according to Embodiment 3 of the present invention.

A scanning image display apparatus according to this embodiment is suitable to a projector in which a light beam from a light source means is scanned by a resonance type horizontal scanning means 203 and, for example, a galvano type vertical scanning means 207, which are separated from each other, so that an image is displayed for observation on a screen 220 serving as the surface to be scanned.

A light source means 201 is composed of a semiconductor laser or a wavelength conversion means using a semiconductor laser as a base. In FIG. 15, the single light source means 201 is shown, however, the light source means 201 can be also composed of, for example, a plurality of light source means for emitting red light, blue light, and green light. The light source means 201 is electrically connected with a light source control circuit 223 and-optical modulation is performed.

A light beam 209 emitted from the light source means 201 is incident on the horizontal scanning means 203 through an optical system 202. The horizontal scanning means 203 is electrically connected with a horizontal scanning means control circuit 222. The light beam 209 incident on the horizontal scanning means 203 is scanned in the horizontal direction, for example, as light beams 209a, 209b, and 209c. The light beams deflected form light source images 209a', 209b', and 209c' on a surface to be scanned 205 through a first relay optical system 204. Synchronization light detecting means 210 (210a and 210b described later) are disposed on the surface to be scanned 205. The synchronization light detecting means 210a and 210b are connected with a control circuit 221 for synchronization light detecting means. The light beam transmitting through the surface to be scanned 205 is incident on-the vertical scanning means 207 through a second relay optical system 206 and scanned by the scanning means. The light beam scanned by the vertical scanning means 207 is incident on a projection optical system 208. The screen 220 is scanned with the light beam from the projection optical system 208. The light source control circuit 223, the horizontal scanning means control circuit 222, the vertical scanning means control circuit 225 and the control circuit 221 for synchronization light detecting means are connected with a display portion control circuit 224. Those control circuits are controlled by the display portion control circuit 224 such that an image based on a signal from a video signal input means (not shown) is formed at a predetermined position. The horizontal scanning means 203 is manufactured by a semiconductor process and performs reciprocating scanning with light in the horizontal direction by the oscillation.

Figure 16:
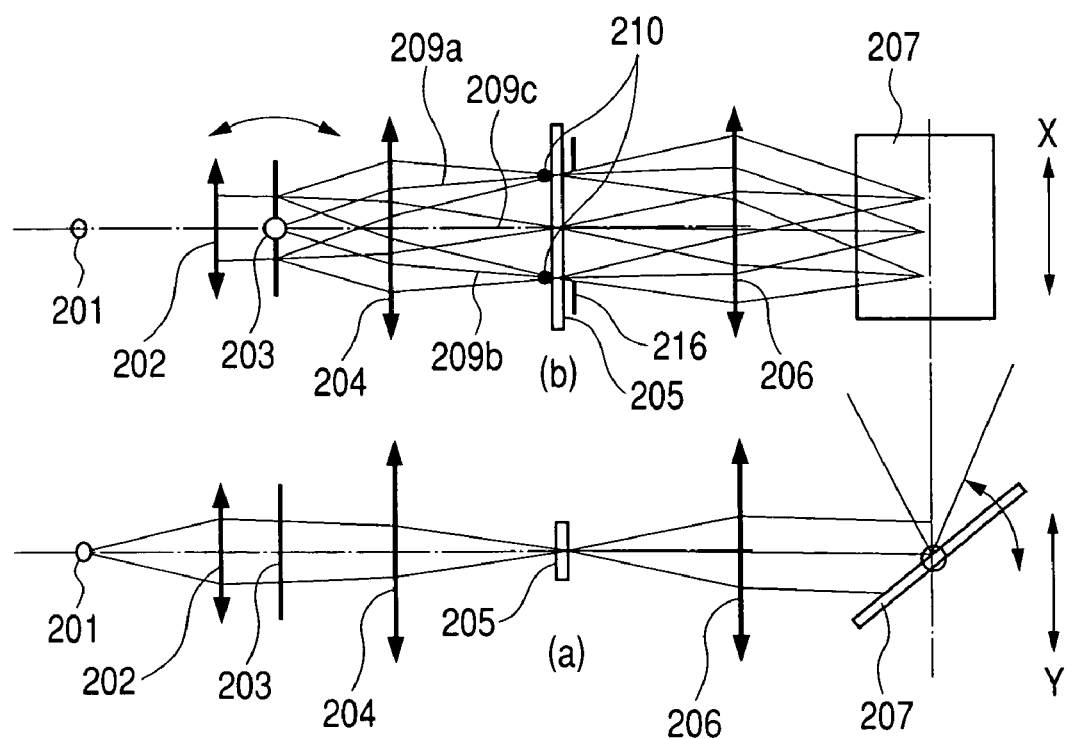
FIG. 16 is an explanatory view showing an optical path of an optical system shown in FIG. 15.

FIG. 16 shows an optical path of an optical system in this embodiment. (a) of FIG. 16 shows a vertical scanning direction sectional view of a plane including the optical axis and the y-axis. (b) of FIG. 16 shows a horizontal scanning direction sectional view of a plane including the optical axis and the x-axis. In FIG. 16, the same reference numerals as those in FIG. 15 indicate the same functions and therefore the descriptions are omitted here. A light beam emitted from the light source means 201 is incident on the horizontal scanning means 203 through the optical system 202. As shown in (b) of FIG. 16, the horizontal scanning means 203 scans the light beam in only the horizontal direction. The scanning light beams 209a, 209b, and 209c form the light source images 209a', 209b', and 209c' on the surface to be scanned 205 through the first relay optical system 204. An area between the light source images 209a' and 209c' corresponds to an effective area 211 for drawing an actual image in the horizontal scanning direction. The synchronization light detecting means 210a and 210b are set outside the effective area 211 on the surface to be scanned 205 in the horizontal direction. A light shielding means 216 is disposed to prevent a light beam outside the effective area 211 from reaching the screen 220.

The light beam transmitting through the surface to be scanned 205 is incident on the vertical scanning means 207 through the second relay optical system 206 and scanned by the scanning means.

Figure 17:
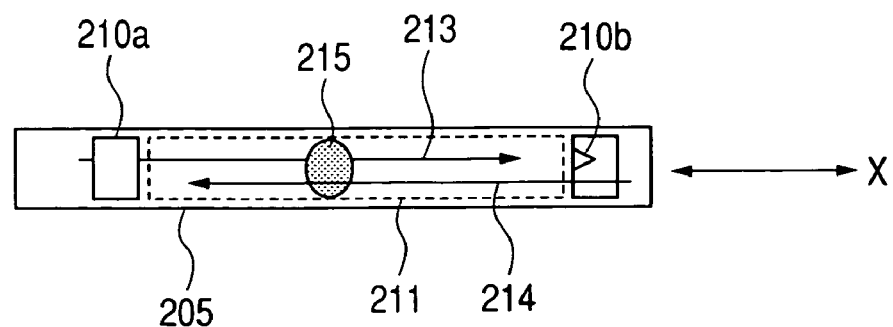
FIG. 17 is an explanatory view showing an arrangement of a synchronization light detecting means on the surface to be scanned.

FIG. 17 shows a relative positional relationship between a scanning light beam on the surface to be scanned 205 shown in FIG. 15 and the synchronization light detecting means 210a and 210b. A light source image 215 on the surface to be scanned 205 is scanned in directions indicated by arrows 213 and 214 (x-direction). In FIG. 17, the lines 213 and 214 are shown separated from each other, however, oscillation scanning is performed on the same line in actual since scanning is performed in a direction by the scanning means 203.

Each of the synchronization light detecting means 210a and 210b is the same photoelectric transducer as that in Embodiment 1. By continuous emission of light from the light source means outside the effective area 211, an image alignment is performed in reciprocating scanning by controlling the light source means 201, the horizontal scanning means 203, and the vertical scanning means 207 based on information related to a time interval between the detections of the synchronization light detecting means 210a and 210b. As described in this embodiment, when the light source image 215 is formed between the horizontal scanning means 203 and the vertical scanning means 207 and time information detected by the synchronization light detecting means 210a and 210b at the image formed position is detected, it is possible to perform synchronization detection for each of the outward path and the homeward path in horizontal scanning. The synchronization detection may be performed each cycle of the horizontal scanning, or may be performed one time per several cycles of the horizontal scanning in synchronization with the vertical scanning means 207.

Figure 18:
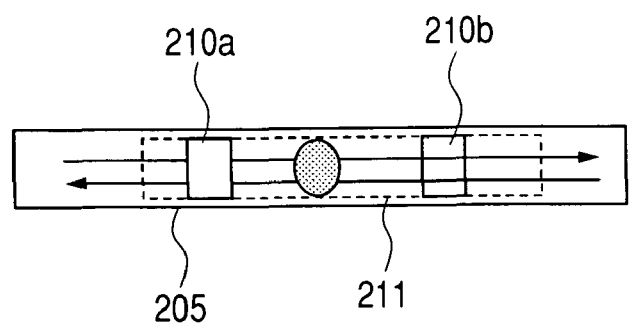
FIG. 18 is an explanatory view showing another arrangement of the synchronization light detecting means on the surface to be scanned.

FIG. 18 is an explanatory view in the case where an arrangement of the synchronization light detecting means 210a and 210b is changed, which are disposed within the effective area 211.

Figure 19:
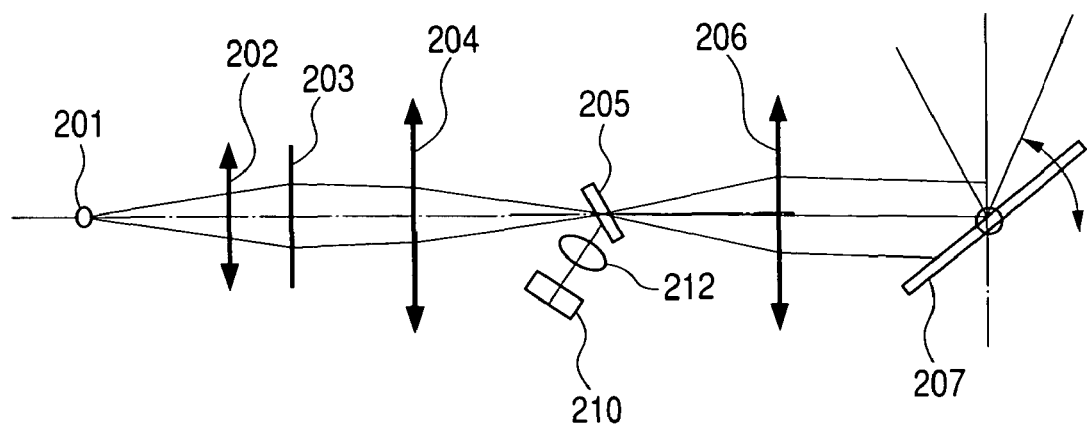
FIG. 19 is an explanatory view showing an optical arrangement of the synchronization light detecting means.

FIG. 19 is a structural view showing an optical path of an optical system in the case shown in FIG. 18, which shows a section in the vertical scanning direction. Part of light is reflected on the surface to be scanned 205 and allowed to enter the synchronization light detecting means 210 through an optical system 212.

Because the horizontal scanning means 203 oscillates, a scanning speed is high in the vicinity of the center of scanning amplitude in the horizontal scanning direction, thereby improving the precision of the synchronization detection. The synchronization light detecting means 210a and 210b are disposed within the effective area 211. Therefore, when a synchronization detection signal such as continuous oscillating light is utilized, such light beam is incident on the second relay optical system 206. In this case, by enabling to synchronize the horizontal scanning means 203 and the vertical scanning means 207 with the emission of the synchronization detection light, the emission of the synchronization detection light may be synchronized when the image is not displayed.

In this embodiment, the synchronization detection is performed based on the time information detected from the two synchronization light detecting means using the photoelectric transducer. As in Embodiment 2, the synchronization light detecting means 210 shown in FIG. 19 can be composed of an area sensor to detect information related to the position of a light beam on the surface to be scanned 205.

As described above, according to this embodiment, in the scanning image display apparatus for displaying the image by the two-dimensional raster scanning with the light beam emitted from the light source means, a displacement in position of the image in reciprocating scanning can be corrected to display the preferable quality image without overlapping the light beam for drawing the image with the light beam for synchronization detection.

Figure 21:
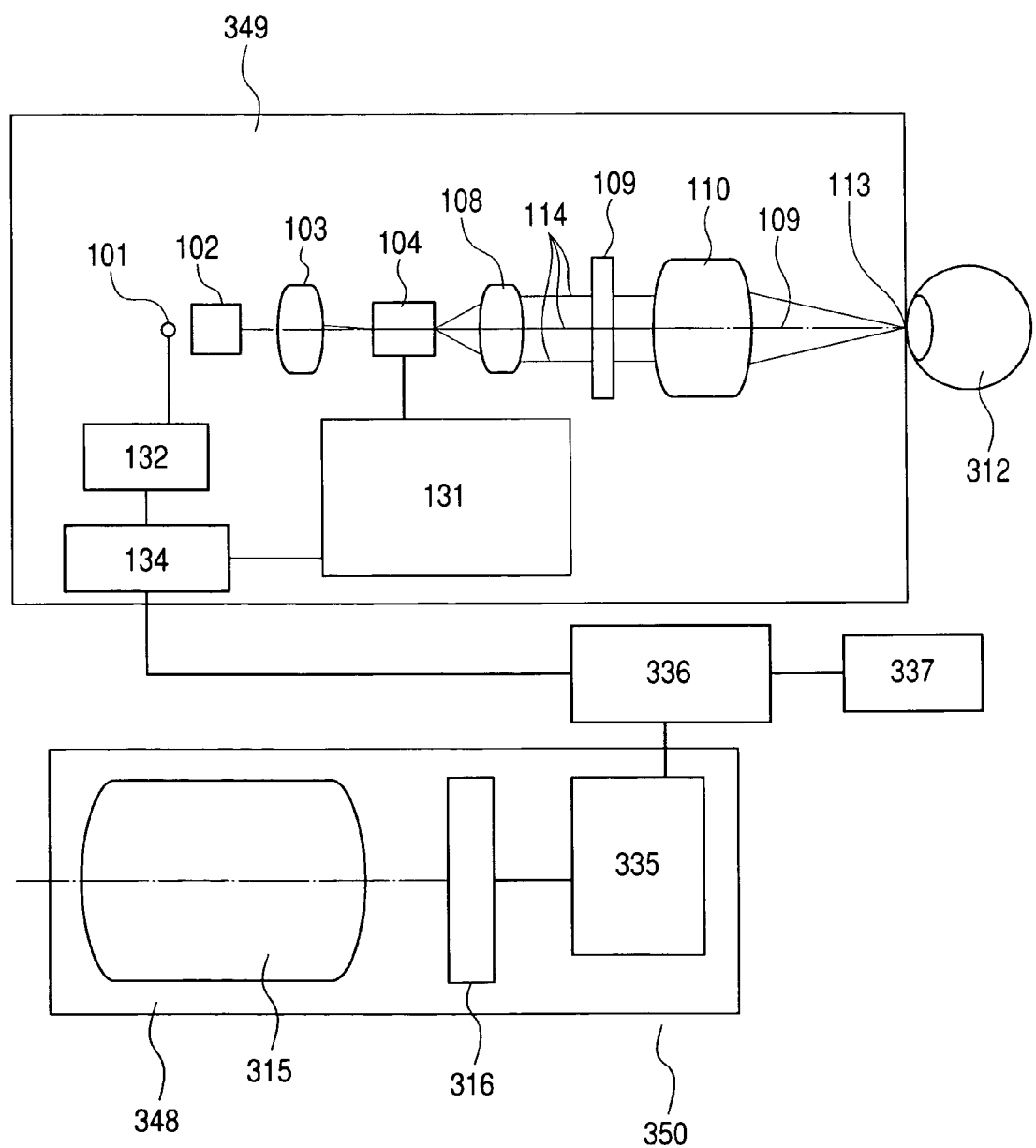
FIG. 21 is a main part schematic view showing an image taking apparatus according to an embodiment of the present invention.

FIG. 21 is a structural schematic diagram showing an image taking apparatus (such as a video camera or a digital camera) including the scanning image display apparatus shown in FIG. 1. In FIG. 21, a display portion 349 indicates a simple structure of the scanning image display apparatus shown in FIG. 1. In FIG. 21, the same reference numerals are provided for the same members as those shown in FIG. 1. An image taking portion 348 includes: an image taking optical system 315; an image taking element (CCD) 316 on which an image is formed by the image taking optical system 315; and an image taking element drive circuit 335 for controlling the image taking element 316. The display portion 349 and the image taking portion 348 are included in a camera apparatus (image taking apparatus) 350 and controlled by a device control circuit 336. A mode for subject to be taken an image can be selected through an interface portion 337.

An image taken by the image taking portion 348 is inputted to the display portion drive circuit 134 of the display portion 349 through the device control circuit 336. Then, an observer (not shown) observes the image, which is displayed on the surface to be scanned 109 of the display portion 349 by scanning, through an eye 312 of the observer, which is positioned in an eye point 113. The image taking device 350 is connected with the interface portion 337 for the observer. The mode for subject to be taken an image can be selected through the interface portion 337.

According to the present invention, it is possible to obtain an image display apparatus in which the synchronization signals can be detected with high precision and a preferable quality image can be displayed for observation, and an image taking apparatus including the image display apparatus.

In addition, according to the present invention, it is possible to dispose the synchronization light detecting means capable of eliminating a scanning displacement in the outward scanning and the homeward scanning by detecting the synchronization signals in both the outward path and the homeward path on the surface to be scanned. Therefore, an image display apparatus for displaying a preferable image and an image taking apparatus including the image display apparatus can be provided.

This application claims priority from Japanese Patent Application No. 2003-209600 filed Aug. 29, 2003, which is hereby incorporated by reference herein.

What is claimed is:

1. An image display apparatus comprising:
a light source emitting a light beam which is modulated based on image information;
a scanner scanning a surface to be scanned with the light beam two-dimensionally;
at least one synchronization light detector that detects the light beam scanned by the scanner to obtain a synchronization signal related to a scanning start position of the scanner, and is disposed at a position conjugate to the light source; and
an optical system,
wherein the scanner forms an image on the surface to be scanned with the light beam,
wherein the image formed on the surface to be scanned is observable through the optical system,
wherein the at least one synchronization light detector is provided on the surface to be scanned, but outside an effective area, or on a surface optically conjugate with the surface to be scanned, but outside the effective area,
wherein the scanner comprises a reflection type deflector which is capable of resonating, and forms the image on the surface to be scanned in an outward path and a homeward path, which are caused by an oscillation due to resonance of the reflection type deflector,
wherein the at least one synchronization light detector comprises an area sensor including a plurality of pixels and obtains the synchronization signal using information on position where the scanned light beam is incident on a surface of the area sensor in the outward path and information on position where the scanned light beam is incident on a surface of the area sensor in the homeward path, and
wherein a start writing position in each of the outward path and the homeward path of the scanner on the effective area of the surface to be scanned is controlled using the synchronization signal in each of the outward path and the homeward path from the at least one synchronization light detector, respectively.

2. An image display apparatus according to claim 1, wherein the at least one synchronization light detector uses at least two detecting parts to detect the synchronization signal in each of the outward path and the homeward path on the surface to be scanned, but outside the effective area.

3. An image display apparatus according to claim 1, wherein the scanner comprises one or two scanning portions for performing two-dimensional scanning by scanning in a direction perpendicular to a direction of the oscillation.

4. An image display apparatus according to claim 1, wherein:
the scanner scans with light beam emitted from the light source in a first direction and a second direction perpendicular to the first direction,
the scanner scans faster in the first direction than in the second direction, and
a position of the at least one synchronization light detector and the effective area are different from each other in the second direction.

5. An image display apparatus according to claim 1, wherein:
the scanner reciprocally scans with the light beam in a first direction while the scanner scans with the light beam in a second direction perpendicular to the first direction,
the at least one synchronization light detector includes a first synchronization light detector and a second synchronization light detector,
the first and second synchronization light detectors are disposed apart from each other in the first direction, and
the scanner scans with the light beam based on a result of the first and second synchronization light detectors.

6. An image display apparatus according to claim 1, wherein the light beam is continuously emitted from the light source to the surface outside the effective area, on which the at least one synchronization light detector is disposed.

7. An image display apparatus according to claim 1, wherein:
the at least one synchronization light detector detects incident position information of scanning light in each of the outward path and the homeward path, and
the start writing position in each of the outward path and the homeward path is controlled based on the incident position information of the scanning light.

8. An image taking apparatus comprising:
an image taking portion for taking an image of a subject; and an image display apparatus comprising:
a light source emitting a light beam which is modulated based on image information;
a scanner scanning a surface to be scanned with the light beam two-dimensionally;
at least one synchronization light detector that detects the light beam scanned by the scanner to obtain a synchronization signal related to a scanning start position of the scanner, and is disposed at a position conjugate to the light source; and
an optical system,
wherein the scanner forms an image on the surface to be scanned with the light beam,
wherein the image formed on the surface to be scanned is observable through the optical system,
wherein the at least one synchronization light detector is provided on the surface to be scanned, but outside an effective area, or on a surface optically conjugate with the surface to be scanned, but outside the effective area,
wherein the scanner comprises a reflection type deflector which is capable of resonating, and forms the image on the surface to be scanned in an outward path and a homeward path, which are caused by an oscillation due to resonance of the reflection type deflector,
wherein the at least one synchronization light detector comprises an area sensor including a plurality of pixels and obtains the synchronization signal using information on position where the scanned light beam is incident on a surface of the area sensor in the outward path and information on position where the scanned light beam is incident on a surface of the area sensor in the homeward path, and
wherein a start writing position in each of the outward path and the homeward path of the scanner on the effective area of the surface to be scanned is controlled using the synchronization signal in each of the outward path and the homeward path from the at least one synchronization light detector, respectively,
wherein the image taken by the image taking portion is displayed on the image display apparatus.

9. An image taking apparatus according to claim 8, wherein the light beam is continuously emitted from the light source to the surface outside the effective area, on which the at least one synchronization light detector is disposed.

10. An image display apparatus according to claim 8, wherein:
the at least one synchronization light detector detects incident position information of scanning light in each of the outward path and the homeward path, and
the start writing position in each of the outward path and the homeward path is controlled based on the incident position information of the scanning light.

* * * * *